United States Patent Office 3,337,490
Patented Aug. 22, 1967

3,337,490
PHENOXY COMPOUNDS AS WETTING AGENTS
FOR THERMOPLASTIC COMPOSITIONS
Erwin Aron, Paterson, N.J., assignor to Technical Processing, Inc., Paterson, N.J., a corporation of New Jersey
No Drawing. Filed June 22, 1964, Ser. No. 377,105
9 Claims. (Cl. 260—31.4)

This invention relates to novel phenoxy compounds and to novel polymer compositions containing these phenoxy compounds.

It is well known that plasticizers can improve the flow characteristics of plastics by reducing the viscosity of the mixtures. However, such plasticizers have to be used in rather high percentages and therefore change the physical characteristics of the end-product to a great extent. Moreover even the use of large amounts of such plasticizers does not provide the plastic compounds with pronounced improvements in their ability to wet surfaces and penetrate porous materials.

I have discovered a novel class of phenoxy compounds which when added in small amounts to thermoplastic compounds such as polyvinyls, polyacrylics, polyethylenes, polystyrenes, etc., will materially enhance the wetting properties of these thermoplastic compounds without materially changing their other characteristics.

My novel phenoxy compounds have the general formula:

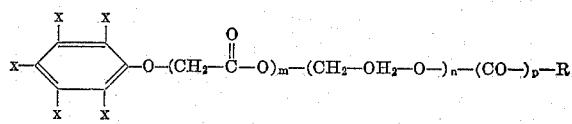

wherein $x$ is a radical selected from the group consisting of halogen, hydrogen and alkyl groups having between 8 and 12 carbon atoms, $m$ is an integer from 0 to 1, $n$ is an integer from 0 to 4, $p$ is an integer from 0 to 1, and R is a radical selected from the group consisting of alkyl radicals having from 1 to 18 carbon atoms and aryl radicals substituted with alkyl groups having from 8 to 18 carbon atoms.

These compounds may be prepared by a variety of procedures depending upon the specific compound to be prepared. Thus when it is desired to produce compounds of the general formula above where $m$, $n$ and $p$ are all 0, metal phenates may be reacted with alkyl halides as shown in the following equation:

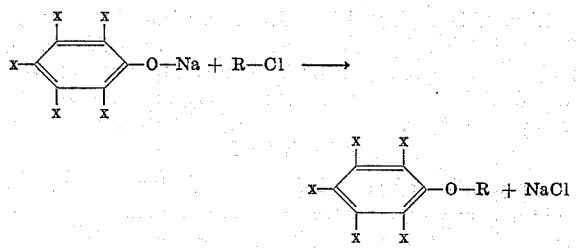

When it is desired to produce compounds of the general formula above where $m=1$ but where $n$ and $p$ are 0, phenoxyacetic acids may be reacted with alcohols as shown in the following equation:

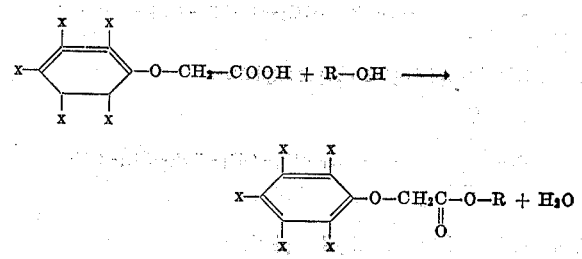

When it is desired to produce compounds of the general formula above where $m=1$ and $n$ is 1 to 4, but where $p=0$, phenoxyacetic acids may be reacted with glycolmono-ethers as shown by the following equation:

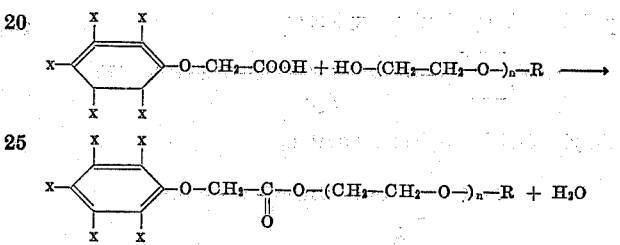

When it is desired to prepare compounds of the general formula above where $m$ is 1, $n$ is 1 to 4 and $p$ is 1, phenoxyacetic acids may be reacted with glycolmonoesters as shown by the following equation:

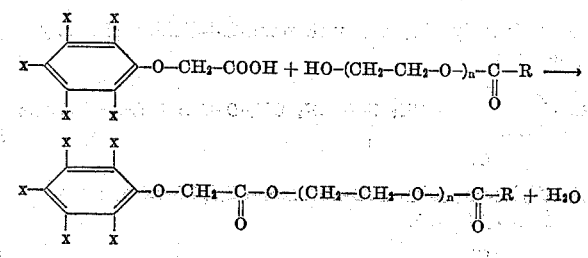

When it is desired to prepare compounds of the general formula above where $m$ is 0 but where $n$ is 2 and $p$ is 1, 1-phenoxy-2-(2-halide-ethoxy) ethanes may be reacted with metal salts of fatty acids as shown by the following equation:

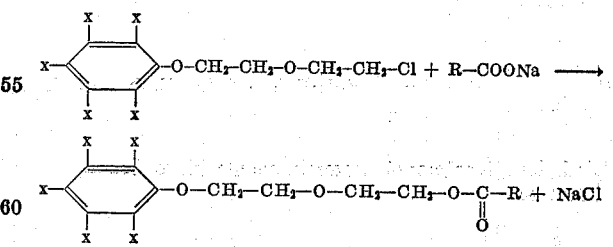

In carrying out the above described reactions, $x$ and R are as defined in the general formula above.
Among the novel phenoxy compounds of this invention which may be prepared by the above described processes are the following:

2,4,6-trichlorophenyldiglycolether stearate

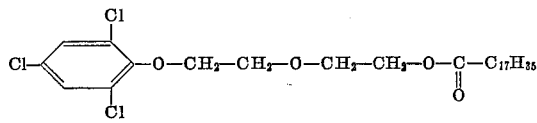

p-Chlorophenyldiglycolether cocoate

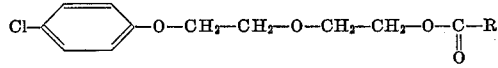

2,4,5-trichlorophenyl-2-ethylhexylether

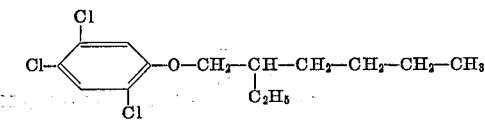

Pentachlorophenyl-2-ethylhexylether

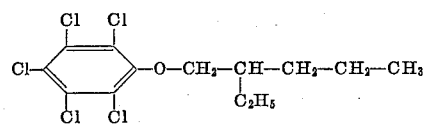

p-Chlorophenyl-2-ethylhexylether

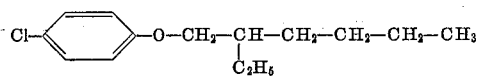

Cetyl 2,4-dichlorophenoxy acetate

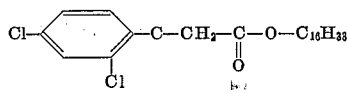

5-ethylnonyl-2-2,4-dichlorophenoxy acetate

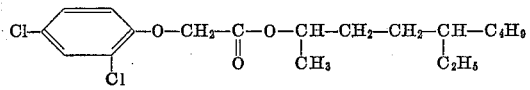

Diethyleneglycolmonolauratemono-2,4-dichlorophenoxy acetate

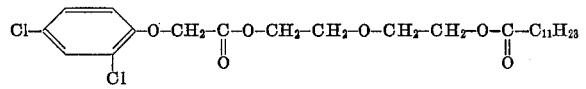

Diethyleneglycolmonolauratemono-2,3,4,6-tetrachlorophenoxy acetate

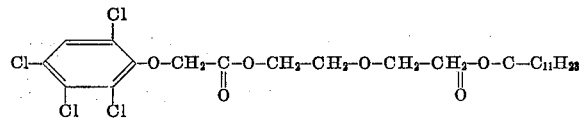

Diethyleneglycolmonolauratemono-2,4,5-trichlorophenoxy acetate

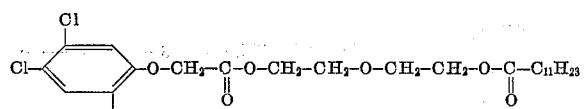

Diethyleneglycolmonolauratemonopentachlorophenoxy acetate

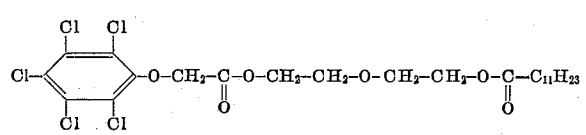

Tetraethyleneglycolnonylphenolether-2,4,5-trichlorophenoxy acetate

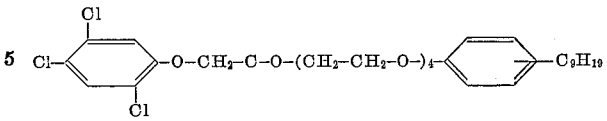

Tetraethyleneglycolnonylphenolether-2,4-dichlorophenoxy acetate

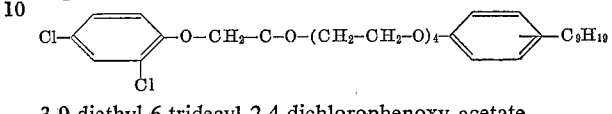

3,9-diethyl-6-tridecyl 2,4-dichlorophenoxy acetate

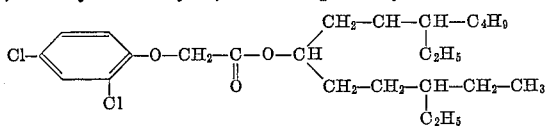

Tetraethyleneglycolnonylphenolether acetate

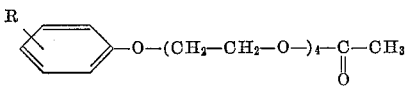

I have found that when the phenoxy compounds of the above general formula are incorporated in minor amounts, e.g. from about ½ to 2% in thermoplastic compounds such as polyvinyls, polyacrylics, polystyrenes, polyethylenes, etc., the wetting properties and penetration properties of these compounds are materially increased. Plastic compositions containing these novel phenoxy compounds are of particular value for laminations where strong bonds with porous surfaces are desired, and in the manufacture of reinforced plastics by obtaining a more thorough contact between polymer and filler. In molding thermoplastic compositions containing small amounts of these phenoxy compounds give clearer details and also reduce the number of rejects. Likewise the phenoxy compounds of this formula may be used in rubber formulations to aid in the dispersion of carbon black, to penetrate nylon and rayon tire cords and thus improve the contact with the rubber itself for better fusing of rubber plies.

The following examples are illustrative only of this invention and many modifications will be apparent to those skilled in the art.

EXAMPLE 1

*Preparation of 2,4,6-trichlorophenyldiglycolether stearate*

0.4 g. of sodium hydroxide was dissolved in 50 cc. of 99.5% of isopropanol and neutralized with 2.7 g. stearic acid to which was added 3.0 g. of 1-(2-chloroethoxy)-2-(2,4,6-trichlorophenoxy)ethane. The mixture was refluxed for 12 hours and then diluted with 100 cc. of water. The product was extracted with 10 cc. of carbon tetrachloride and was recovered by evaporating the carbon tetrachloride.

EXAMPLE 2

*Preparation of p-chlorophenyl-2 ethylhexylether*

15 g. of 2-ethylhexylchloride, 13 g. of p-chlorophenol, 8 g. of 50% sodium hydroxide and 20 cc. of 99.5% isopropanol were refluxed for 24 hours. The mixture was then diluted with water and the oil phase separated from the aqueous layer.

EXAMPLE 3

*Preparation of cetyl 2,4-dichlorophenoxy acetate*

11.0 g. of 2,4-dichlorophenoxyacetic acid was esterified with 12.0 g. of cetyl alcohol at 135° C. The product was washed with a dilute aqueous sodium carbonate solution to remove excess acidic material then washed with water and dried.

EXAMPLE 4

*Preparation of diethyleneglycolmonolauratemono-2,4-dichlorophenoxy acetate*

11.0 g. of 2,4 dichlorophenoxyacetic acid was esterified with 16.0 g. of diethyleneglycolmonolaurate at 135° C. The reaction mixture was washed with an aqueous sodium carbonate solution and extracted with 70% isopropanol and the undissolved ester dried.

EXAMPLE 5

*Preparation of diethyleneglycolmonolauratemonopentachlorophenoxy acetate*

5.0 g. of pentachlorophenoxy acetic acid was esterified with 5.0 g. of diethyleneglycolmonolaurate in the presence of 0.5 g. of Twitchell Catalyst. The reaction was carried out for eight hours at 140° C. The mixture was washed with an aqueous solution of sodium carbonate, the product extracted with 70% isopropanol and dried.

EXAMPLE 6

*Preparation of tetraethyleneglycolnonylphenolether-2,4,5 trichlorophenoxy acetate*

30.6 g. of tetraethyleneglycolnonylphenolether was reacted with 26.0 g. of 2,4,5-trichlorophenoxyacetic acid. The mixture was washed with sodium carbonate, the product extracted with 70% isopropanol and dried.

EXAMPLE 7

*Preparation of tetraethyleneglycolnonylphenolether acetate*

10.0 g. of tetraethyleneglycolnonylphenolether was reacted with 3.0 g. of acetic anhydride for 30 minutes at 140° C. The reaction mixture was washed twice with the 20 cc. of water and then dried in an oven at 140° C.

The use of the compounds of this invention in various plastic and rubber formulations are illustrated by the following examples.

EXAMPLE 8

2.0 g. of 3,0-diethyl-6-tridecyl 2,4-dichlorophenoxyacetate was blended at 140° C. with 98.0 g. of polyethylene having a molecular weight of approximately 2500. A few drops of the blend were placed on an engraved metal surface which had been heated to 140° C. After cooling, the polyethylene compound was removed and examined. The reproduction of the engraving was sharper, clearer, and more flawless than reproductions obtained in identical manner with straight polyethylene or a blend made of 98.0 g. polyethylene and 2.0 g. of di-(2-ethylhexyl) phthalate.

EXAMPLE 9

2.0 g. of diethyleneglycolmonolaurate-mono-2,4,5-trichlorophenoxyacetate was blended at 140° C. with 98.0 g. of polyethylene having a molecular weight of approximately 2500. A few drops of the blend were placed on an engraved metal surface which had been heated to 140° C. After cooling the polyethylene compound was removed and examined. The reproduction of the engraving was sharper, clearer and more flawless than reproductions obtained in an identical manner with straight polyethylene or a blend of 98 g. of polyethylene and 2.0 g. of di-(2-ethylhexyl) phthalate.

EXAMPLE 10

2.0 g. of 3,9-diethyl-6-tridecyl 2,4-dichlorophenoxyacetate was blended at 220° C. with 98.0 g. of polystyrene resin. The compound was pressed with 100 lbs. p.s.i. force onto an engraved metal surface which had been heated to 220° C. After cooling the polystyrene compound was removed and examined. The reproduction of the engraving was sharper, clearer and more flawless than a reproduction obtained in an identical manner with a straight polystyrene resin.

EXAMPLE 11

2.0 g. of 3,9-diethyl-6-tridecyl 2,4-dichlorophenoxyacetate was blended at 220° C. with 98.0 g. of polyacrylic resin. The compound was pressed with 100 lbs. p.s.i. force onto an engraved metal surface which had been heated to 220° C. After cooling, the polyacrylic compound was removed and examined. The reproduction of the engraving was sharper, clearer and more flawless than a reproduction obtained in an identical manner with the straight polyacrylic resin.

EXAMPLE 12

A polyvinyl sheet was made according to the following formulation:

|  | G. |
|---|---|
| Polyvinylchloride resin | 100.0 |
| Dioctyl phthalate | 45.0 |
| Dioctyladipate | 13.0 |
| Epoxidized soybean oil | 7.0 |
| Barium-cadmium-zinc stabilizer | 2.0 |

The sheet made from this formulation served as the control in the following tests. Six other sheets were made according to this formulation except that sheets Nos. 2, 3 and 4 contained 0.5 g., 1.0 g. and 2.0 g. of 5-ethyl-nonyl-2 2,4-dichlorophenoxyacetate respectively, and sheets Nos. 5, 6 and 7 contained 0.5 g., 1.0 g. and 2.0 g. of diethyleneglycolmonolaurate-mono-2,4 - dichlorophenoxyacetate respectively.

These polyvinyl sheets were laminated to clean cotton cloth at 165° C. and 400 lbs. p.s.i. for 10 seconds. The amount of pull necessary to peel the sheeting from the cotton cloth was then measured in a mechanical tester which was operating at a peel speed of 12" per minute. Three tests were run on each sheeting. The following table shows the results of the tests:

TABLE I

[Peel Strengths (in ounces)]

| Test No. | Control #1 (no additive) | #2 (0.5 g.) | #3 (1.0 g.) | #4 (2.0 g.) | #5 (0.5 g.) | #6 (1.0 g.) | #7 (2.0 g.) |
|---|---|---|---|---|---|---|---|
| 1 | 75 | 74 | 119 | 93 | 96 | 115 | 85 |
| 2 | 71 | 93 | 105 | 95 | 110 | Broke | 94 |
| 3 | 68 | 116 | Broke | 100 | Broke | Broke | 95 |
| Average of three tests | 71 | 94 | 112 | 96 | 103 | 115 | 91 |

EXAMPLE 13

A polyvinyl sheet was made according to the following formulation:

|  | G. |
|---|---|
| Polyvinylchloride resin | 100.0 |
| Dioctyl phthalate | 45.0 |
| Dioctyladipate | 13.0 |
| Epoxidized soybean oil | 7.0 |
| Barium-cadmium-zinc stabilizer | 2.0 |

The sheet made from this formulation served as the control in the following test. Three other sheets were made according to this formulation except that sheets Nos. 2, 3 and 4 contained 0.5 g., 1.0 g. and 2.0 g. of tetraethyleneglycolnonylphenolether acetate respectively.

These polyvinyl sheets were laminated to clean cotton cloth at 165° C. and 400 lbs. p.s.i. for 10 seconds. The amount of pull necessary to peel the sheeting from the cotton cloth was then measured in a mechanical tester which was operating at a peel speed of 12″ per minute. Two tests were run on each sheet. The following table shows the results of the tests:

TABLE II

[Peel strengths (in ounces)]

| Test No. | Control #1 (no additive) | #2 (0.5 g.) | #3 (1.0 g.) | #4 (2.0 g.) |
| --- | --- | --- | --- | --- |
| 1 | 20 | 110 | 98 | 115 |
| 2 | 38 | 110 | 82 | Broke |
| Average of two tests | 29 | 110 | 90 | 115 |

The above tests demonstrate the improved bonding characteristics of thermoplastic compositions that contain small amounts of the compounds of this invention.

EXAMPLE 14

A rubber formulation containing 137.5 g. of SBR1710 rubber (a butadiene styrene copolymer), 68.7 g. of carbon black and 0.4 g. of p-chlorophenyldiglycolether cocoate was prepared. The rubber was mixed in a Banbury mixer for 30 seconds and then ½ of the carbon black and all of the p-chlorophenyldiglycolether cocoate was added and mixed for 1½ minutes. The remainder of the carbon black was added and the mixing continued for 2½ minutes.

An identical mix without the p-chlorophenyldiglycolether cocoate was made and processed as above. Microphotographs of each mixture were compared and showed an improvement in the dispersion of the carbon black in the mixture which contained the cocoate.

EXAMPLE 15

A mixture containing 137.5 g. of SBR1710 rubber (a butadiene styrene copolymer), 68.7 g. of carbon black and 0.4 g. of p-chlorophenyl-2-ethylhexylether was prepared. The rubber was mixed in a Banbury mix for 30 seconds and then one-half of the carbon black and all of the p-chlorophenyl-2-ethylhexylether was added and mixed for 1½ minutes. Then the remainder of the carbon black was added and the mixing continued for 2½ minutes. An identical mix without the p-chlorophenyl-2-ethylhexylether was made and processed as described above. Micro-photographs of each mixture were taken and showed that there was an improvement in the dispersion of the carbon black throughout the mixture containing the ethylhexylether.

EXAMPLE 16

A mixture having the following formulation was prepared:

| | G. |
| --- | --- |
| SBR1710 (a butadiene styrene copolymer) | 137.5 |
| Carbon black | 68.7 |
| Cetyl-2,4 dichlorophenoxyacetate | 0.4 |
| Stearic acid | 1.0 |
| Zinc oxide | 4.0 |
| Sulfur | 1.8 |
| Nobs accelerator | 1.0 |

The rubber was mixed in a Banbury mixer for 30 seconds. Then ½ of the carbon black and all of the cetyl-2,4-dichlorophenoxyacetate was added and mixed for 1 minute and 45 seconds. The remainder of the carbon black and stearic acid was then added and mixing was continued for 3 minutes, 15 seconds. Then the zinc oxide, sulfur and accelerator were added and mixing continued for 2 minutes. Cures were made for 30, 60 and 100 minutes at 290° F. Optimum tensile strength was 2383 against 2300 for the same composition without cetyl-2,4-dichlorophenoxyacetate.

EXAMPLE 17

A composition having the following formulation was prepared:

| | G. |
| --- | --- |
| SBR1710 (a butadiene styrene copolymer) | 137.5 |
| Carbon black | 68.7 |
| Diethyleneglycolmonolaurate - mono - 2,4-dichloro-phenoxyacetate | 0.4 |
| Stearic acid | 1.0 |
| Zinc oxide | 4.0 |
| Sulfur | 1.8 |
| Nobs accelerator | 1.0 |

Mixing was carried out as set forth in Example 16 above. Cures were made for 30, 60 and 100 minutes at 290° F. Optimum tensile strength was 2550 against 2300 for the same composition without the diethylglycolmonolaurate-mono-2,4-dichlorophenoxyacetate.

Having thus provided a written description of my invention, it should be understood that the appended claims define the scope thereof.

I claim:

1. Thermoplastic compositions comprising a major portion of a thermoplastic resin selected from the group consisting of polyvinylchlorides, polyacrylics, polystyrenes and polyethylenes and a phenoxy compound having the general formula:

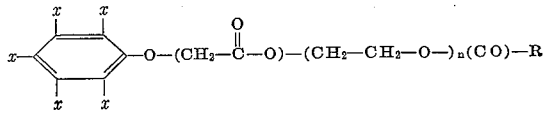

wherein $x$ is a substituent selected from the group consisting of hydrogen and halogen, $n$ is an integer from 1 to 4 and R is an alkyl radical having from about 10 to 18 carbon atoms in the chain in an amount sufficient to enhance the wetting properties of said resin when in a molten form.

2. Thermoplastic compositions comprising a major portion of a thermoplastic resin selected from the group consisting of polyvinylchlorides, polyacrylics, polystyrenes and polyethylenes and a phenoxy compound having the general formula:

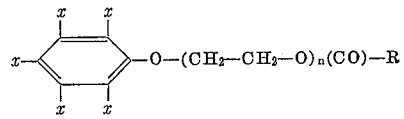

wherein $x$ is selected from the group consisting of hydrogen, halogen and alkyl radicals of from about 8 to 12 carbon atoms, and at least one of said $x$ groups must be one of said alkyl groups, $n$ is an integer from 1 to 4 and R is an alkyl group having from 1 to 4 carbon atoms in the chain in an amount sufficient to enhance the wetting properties of said resin when in a molten form.

3. Thermoplastic compositions according to claim 1 wherein said phenoxy compound is present in an amount from about 0.5 to 2% based on the total weight of the composition.

4. Thermoplastic compositions according to claim 3 wherein said phenoxy compound is diethyleneglycol-monolauratemono-2,4,5-trichlorophenoxyacetate.

5. Thermoplastic compositions according to claim 9 wherein said phenoxy compound is tetraethyleneglycol-nonylphenoletheracetate.

6. Thermoplastic compositions according to claim 3 wherein said phenoxy compound is diethyleneglycol-monolauratemono-2,4-dichlorophenoxyacetate.

7. A rubber composition comprising a major portion of styrene-butadiene rubber and carbon black and a small but effective amount of a phenoxy compound having the general formula:

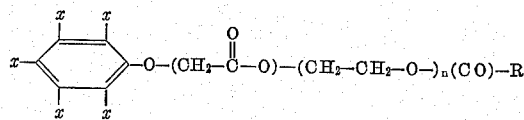

wherein $x$ is a substituent selected from the group consisting of hydrogen and halogen, $n$ is an integer from 1 to 4 and R is an alkyl radical having from about 10 to 18 carbon atoms in the chain in an amount sufficient to enhance the dispersion properties of said rubber.

8. A rubber composition according to claim 7 wherein said phenoxy compound is diethyleneglycolmonolaurate-mono-2,4-dichlorophenoxyacetate.

9. Thermoplastic compositions according to claim 2 wherein said phenoxy compound is present in an amount from about 0.5 to 2% based on the total weight of the composition.

References Cited

UNITED STATES PATENTS

| | | | |
|---|---|---|---|
| 2,253,886 | 8/1941 | Britton et al. | 260—31.4 |
| 2,559,146 | 7/1951 | Dazzi | 260—31.4 |
| 2,578,853 | 12/1951 | Stevenson | 260—612 |
| 2,711,999 | 6/1955 | Brandner et al. | 260—31.4 |
| 3,123,580 | 3/1964 | Dunn et al. | 260—31.4 |
| 3,235,582 | 2/1966 | Hennis | 260—473 |

MORRIS LIEBMAN, *Primary Examiner.*

L. T. JACOBS, *Assistant Examiner.*